United States Patent [19]
Lo

[11] Patent Number: 5,657,111
[45] Date of Patent: *Aug. 12, 1997

[54] 3D PHOTOGRAPHIC PRINTER WITH A CHEMICAL PROCESSOR

[75] Inventor: Allen K. Wah Lo, Dunwoody, Ga.

[73] Assignee: Image Technology International, Inc., Norcross, Ga.

[*] Notice: The term of this patent shall not extend beyond the expiration date of Pat. No. 5,424,801.

[21] Appl. No.: 409,358

[22] Filed: Mar. 23, 1995

Related U.S. Application Data

[63] Continuation-in-part of Ser. No. 68,746, May 28, 1993, Pat. No. 5,412,449, and Ser. No. 349,481, Dec. 2, 1994, which is a continuation-in-part of Ser. No. 140,681, Oct. 21, 1993, abandoned, Ser. No. 69,286, May 28, 1993, Pat. No. 5,408,294, Ser. No. 189,786, Feb. 1, 1994, Pat. No. 5,424,801, and Ser. No. 377,442, Jan. 24, 1995.

[51] Int. Cl.⁶ .................................................. G03B 27/32
[52] U.S. Cl. ............................. 355/22; 396/30; 396/613
[58] Field of Search ........................... 354/83–93, 297, 354/301–303, 311, 315; 355/22

[56] References Cited

U.S. PATENT DOCUMENTS

| | | | |
|---|---|---|---|
| 5,028,950 | 7/1991 | Fritsch | 355/22 |
| 5,400,096 | 3/1995 | Kanada et al. | 355/22 |
| 5,408,294 | 4/1994 | Lam | 355/22 |
| 5,412,449 | 5/1995 | Lam | 355/22 |
| 5,424,801 | 6/1995 | Lo et al. | 355/22 |
| 5,436,738 | 7/1995 | Manico | 355/22 |

*Primary Examiner*—Safet Metjahic
*Assistant Examiner*—D. P. Malley
*Attorney, Agent, or Firm*—Deveau, Colton & Marquis

[57] ABSTRACT

A 3D printer that has a chemical processor in-line with the printer. The preferred printer is a single-stage printer that uses two video cameras with different magnification powers for acquiring images from 2D negatives for editing and key subject alignment. One video camera takes full view image for key subject selection and picture cropping, the other video camera which is used for acquiring image data for key subject alignment sees only an enlarged section of the image around the key subject. The single-stage printer uses an automated image matching algorithm to find the relative location of the key subject in each negative frame. The single-stage printer also includes a chemical processor so that photo processing can be part of an in-line printing process.

11 Claims, 6 Drawing Sheets

3D PHOTOGRAPHIC PRINTER WITH A CHEMICAL PROCESSOR

This is a continuation-in-part application of patent application, Ser. No. 08/068,746, filed May 28, 1993, with a Notice of Allowance dated Jun. 22, 1994, now U.S. Pat. No. 5,412,449 and U.S. patent application Ser. No. 08/349,481 filed Dec. 2, 1994, which is a continuation-in-part of U.S. application Ser. No. 08/140,681 filed Oct. 21, 1993 now abandoned; U.S. patent application Ser. No. 08/069,286, filed May 28, 1993 with a Notice of Allowance dated Oct. 7, 1994 now U.S. Pat. No. 5,408,294; U.S. patent application Ser. No. 08/189,786 filed Feb. 1, 1994 with a Notice of Allowance dated Oct. 31, 1994 now U.S. Pat. No. 5,424,801; and U.S. patent application Ser. No. 08/377,442, filed Jan. 24, 1995.

1. Field of the Invention

The present invention relates to a photographic printer for producing 3D pictures on a lenticular print material.

2. Prior Art

In lenticular-type three dimensional (3D) photography, the basic process involves taking a plurality of two dimensional (2D) views from a number of horizontally-spaced vantage points, and exposing these 2D views through a projection lens onto a lenticular print material thereby compressing the 2D views onto each of the lenticules to form line-form images on the underlying photosensitive emulsion. During 3D printing, the 2D views and projection lens must be moved to different position, in relation to the print material, to change the projection angles.

When making a 3D picture, two basic procedures must be carried out to insure a good result: 1) the selection of a key subject in the 2D views, and 2) the alignment of key subject in each 2D view with other the key subject in all other views. This basic process has been discussed in a number of books and patent disclosures. U.S. Pat. No. 4,903,069 (Lam) discloses an apparatus and method of putting a machine-readable code on the negative film to indicate the key subject distance from the camera so that the 3D printer can carried out key subject alignment based on the recorded distance; U.S. Pat. No. 5,028,950 (Fritsch) discloses a dual-stage 3D printer in which the exposure of 2D images is carried out in a printing station while the collecting of key subject information is carried out in a separate editing station. U.S. Pat. No. 5,036,356 (Lo) discloses a key subject alignment method in which a multi-lens camera preloaded with photographic film is used to take a set of 2D images of a target before the camera is delivered to the consumer and, when the film is returned from the camera user, the target images will be used to correct the misalignment of lenses.

The key subject alignment disclosed in the above-mentioned patent is carried out before the 2D images are moved into the exposure position. This approach may cause the misalignment of key subject during the exposure. In particular, in the dual-stage printing method disclosed in U.S. Pat. No. 5,028,950 (Fritsch) where key subject comparison is carried out one mechanical platform while the actual alignment is carried out on another mechanical platform, good alignment is not always insured. Thus, it is desirable to compose the 3D photograph in a single-stage printer where the optics of key subject comparison and the optics for printing are assembled on the same mechanical stage, and the printing is carried out immediately after the key subject comparison is completed to minimize the distortion on the film due to heat and humidity.

Moreover, in all the primers disclosed in the above-mentioned patents, 3D pictures are not processed within the printer. It is desirable to include a chemical processor in the 3D printer so that photo processing is a part of an in-line process and a photo lab can save money and space from not having to install a separate chemical processor.

A chemical processor can be installed in-line with any type of 3D photo printer. It can be installed in-line with the non-scanning 3D photographic printer with a partitioned aperture as disclosed in U.S. patent application Ser. No. 08/349,481 filed Dec. 2, 1994 of which this application is a continuation-in-part application. A chemical processor can also be included with a 3D printer with direct key subject alignment as disclosed in U.S. patent application Ser. No. 08/069,286 filed May 28, 1993, of which this application is a continuation-in-part application. A chemical processor can be included with the dual mode 2D/3D printer as disclosed in U.S. application Ser. No. 08/189,786 filed Feb. 1, 1994 and in application Ser. No. 08/377,442 filed Jan. 24 1995; this application is a continuation-in-part application of these applications. The chemical processor can be included in-line with a single stage 3D photographic printer with fast and accurate key-subject alignment method as disclosed in U.S. patent application Ser. No. 08/068,746 filed May 28, 1993, of which this application is a continuation-in-part application.

A chemical processor can be placed in-line with an automatic three-dimensional photo printer to align the key subject image as disclosed in U.S. Pat. No. 4,903,069 issued Feb. 20, 1990 and in a photographic printer using a linear shutter and method to achieve uniform density of image elements of a 3D photograph disclosed in U.S. Pat. No. 5,019,855 issued May 28, 1991.

SUMMARY OF THE INVENTION

An object of this invention is to produce lenticular type 3D photographs of improved quality in a shorter time. The printer, according to the present invention, uses an automated image comparison means to locate the key subject in each 2D frame (image frame of each 2D view) for alignment. In particular, the computation of the relative locations of key subject is divided into a crude computation step and a fine computation step. Such an approach can reduce by over 80% the computation time needed while achieving the same precision in key subject registration.

A further object of this invention is improve the accuracy in key subject alignment. This object has been achieved by assembling the optics used for printing and the optics used for key subject alignment on one mechanical stage. Furthermore, printing is executed immediately after the key subject alignment is completed.

Another object of this invention is to make photo processing a part of the in-line printing process. This object has been achieved by integrating a chemical processing unit into the printer so that 3D pictures are automatically released into the chemical processor after the exposure is completed. It should be noted that, unlike 2D printing where photographic material is stationary relative to the negative during exposure, 3D printing requires the moving of print material during exposure, in relation to the negatives. The movement of print material adds complication to the integration of a chemical processor into a 3D printer.

Briefly described, this invention discloses a printer that uses two video cameras with different magnifications for viewing the negative. One video camera is used for editing which includes picture cropping, key subject selection and color balancing information collection. The other camera is used solely for acquiring image data around the selected key subject in each frame for key subject alignment. The relative distances of the key subject between frames are computed in two separate steps. A crude step uses a small number of data point to search a large area to find the approximate location of the key subject. This is followed by a fine step which uses a much larger number of data points to search a much smaller area to find the exact location of the key subject. It should be noted that, if a very high speed computer is used for computation and computational time is not an important part of the printing process, it is also useful to carry out a one-step computation using a large number of data points to search a large area to find the exact location of the key subject.

One of the most important features of the printer of the present invention is the use of two video cameras to view the negative. One color camera views a full frame of the negative and presents the image to the operator for picture cropping and key subject selection. This color camera also collects image data for color balancing and density correction. The other camera which can be a color camera or a black-and-white camera, through a taking lens with a much longer focal length, views and acquires only an enlarged section of a small area surrounding the key subject. This image enlargement is essential for achieving an accurate key subject registration on the 3D photograph. The two video cameras can also be replaced by one video camera if the camera has a lens attachment, such as a zoom lens, to change the focal length; or if the camera has a high image resolution such that the pixel size of camera, after taking the printing magnification into consideration, is much smaller than the width of the lenticules.

In the printing cycle for exposing each set of 2D views to compose a 3D picture, the color video camera is moved into proper position of the 2D frame. At this time the operator analyzes the image for color, picture cropping and key subject selection. Once the key subject of the first frame is located the first frame is adjusted so that when the black-and-white (B/W) camera is moved in to view the key subject area, the key subject appears in the center of the video image acquired by the B/W camera. The B/W camera only sees an enlarged section of the first frame covering the key subject and surrounding area. The density value of each pixel within the key subject area is stored in the memory of the computer. These image data will be used to find the X, Y coordinate locations of the key subject in all subsequent frames.

It follows that the negative is moved by an "adjusted frame distance" to a position where the key subject of the next frame is approximately in the direct view of the B/W camera. The computer determines the adjusted frames distance in which the key subject is approximately located. The computer does a search in this area to determine the location of the key subject image. The computer then does a key subject alignment computation based upon a general formula set forth later. A fine computation is then made based upon using every pixel in the area in which the B/W camera is focused.

The computer then does an additional computation to determine that the key subject in the two frames are in satisfactory alignment based upon using the equations set forth later. Once this accomplished, all of the frames are printed onto the print material for this set. This printing cycle is repeated with each set of frames.

In the printer according to the present invention, a chemical processor is also included. It should be noted that, in 3D printing, a print material is moved to different positions during printing to change the projection angles. It is more convenient to compose 3D pictures in separate prints instead of composing them in a roll. Thus, print material is cut into a section of a proper length before it is positioned in the exposing position. After exposure is completed, the cut and exposed section of the print material is released into the chemical processor for photo processing.

A chemical processor can be installed in-line with any type of 3D printer. It can be installed in-line with the non-scanning 3D photographic printer with a partitioned aperture as disclosed in U.S. patent application Ser. No. 08/349,481 filed Dec. 2, 1994 of which this application is a continuation-in-part application. A chemical processor can also be included with a 3D printer with direct key subject alignment as disclosed in U.S. patent application Ser. No. 08/069,286 filed May 28, 1993. A chemical processor can be included with the dual mode 2D/3D printer as disclosed in U.S. application Ser. No. 08/189,786 filed Feb. 1, 1994 and in application Ser. No. 08/377,442 filed Jan. 4, 1995. The chemical processor can be included in-line with a single stage 3D photographic printer with fast and accurate key subject alignment methods as disclosed in U.S. patent application Ser. No. 08/068,746 filed May 28, 1993. The in-line chemical processor can be included with a photographic printer that utilizes a linear shutter as disclosed in U.S. Pat. No. 5,019,885, issued May 28, 1991 and with the automatic three-dimensional photo printer to align the key subject image disclosed in U.S. Pat. No. 4,903,069 issued Feb. 20, 1990.

DETAILED DESCRIPTION OF THE INVENTION

Figure 1:
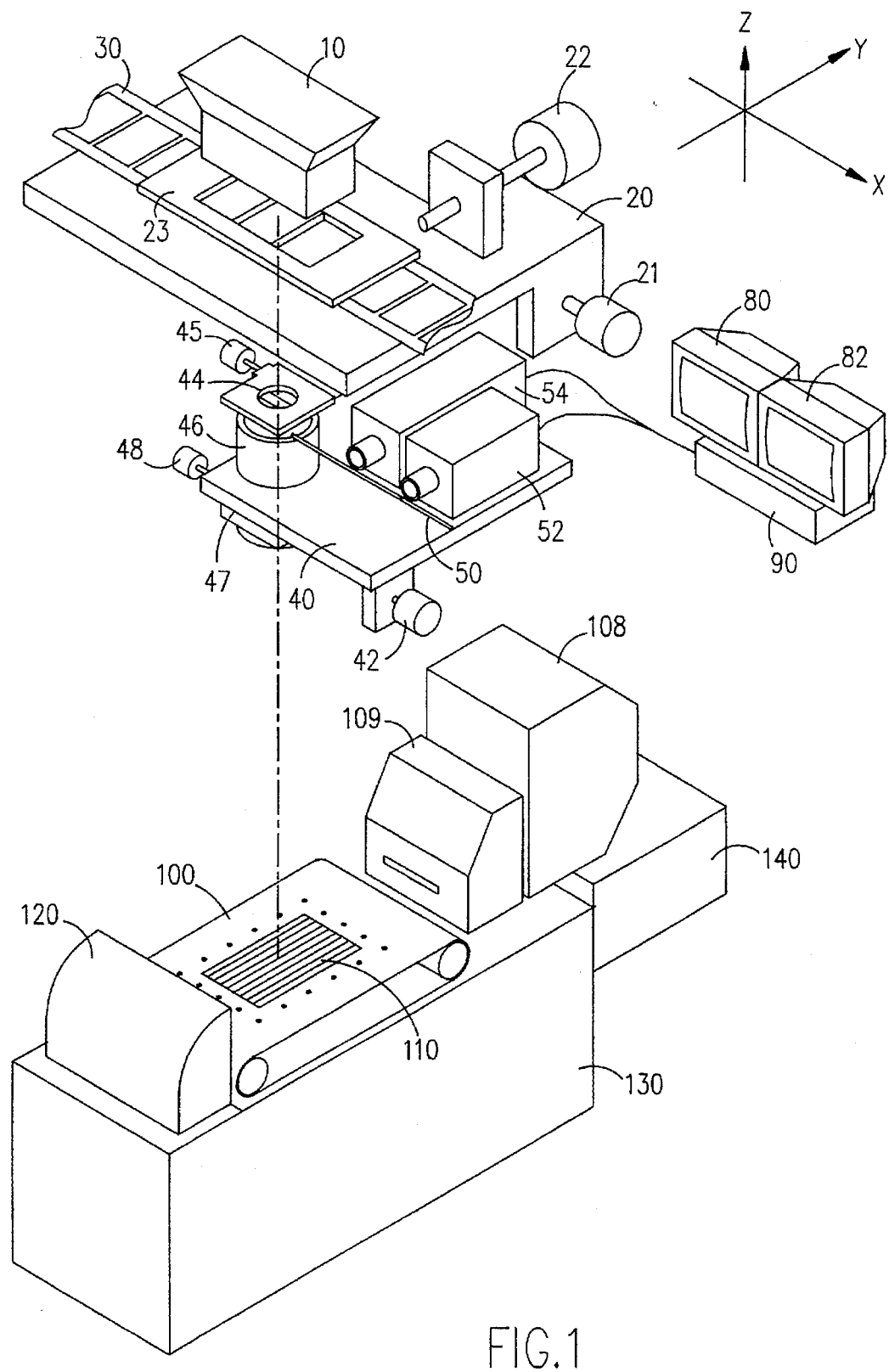
FIG. 1 shows a schematic representation of the preferred embodiment of the present invention, illustrating a single-stage 3D printer having a chemical processor to process 3D pictures within the printer.

FIG. 1 shows a schematic representation of the preferred embodiment of the present invention, illustrating a single-stage 3D printer having a chemical processor so that 3D prints can be immediately processed within the printer. As shown in FIG. 1, the major components of the printers are a lamphouse 10, a negative carrier 20, an optical assembly 40, a text monitor 80, a graphics monitor 82, computer 90, an movable easel 100, a print material cassette 108, a cutter/feeder assembly 109, a chemical processor 130 and a dryer 140. During printing, a section of lenticular print material 110 is positioned on the easel 100 for exposure. The movement of the printer components is specified by the X, Y and Z directions where the XY plane is parallel to the surface of print material 110. The Y direction is parallel to the optical axis of the lenticules of the print material.

The lamphouse 10 has three pairs of color filters in magenta, cyan and yellow to be used for adjusting the color content of the lamphouse output. These color filter pairs are driven by separate stepping motors which are not shown.

Negative carrier 20, driven by motors 21 and 22, is used to move a set of 2D views on the negative film 30 in both the X and Y directions to various positions under the lamphouse 10. Negative carrier 20 has a negative mount 23 with a number of openings matching the image flames on a set of 2D views on negative film 30.

Optical assembly 40, driven by motor 42, moves only in the X direction. The major components on the optical assembly are: an adjustable aperture 44 which is controlled by a motor 45 is used to control the brightness of the picture; a shutter 47 which is controlled by a motor 48 is used to control the exposure time in accordance with the density of the negative; a color video camera 54; a black-and-white (B/W) video camera 52 and a plane mirror 50 (preferably a first-surface mirror) which folds the optical path of the video cameras so that cameras 52 and 54 views the negative at approximately a 90 degree angle. Plane mirror 50 is positioned at approximately 45 degree angle to the optical axis of the video cameras. Video camera 54 is used for presenting a full-frame image to the printer operator for picture cropping, key subject selection and for collecting image data for color/density analysis. Video camera 52 is used for capturing an enlarged section of the key subject and the image immediately surrounding the key subject.

Print material cassette 108 houses a roll of lenticular print material. Cutter/feeder unit 109 is used to retrieve the print material out of material cassette 108 and cut a section of print material at a proper length according to the desired size of the 3D picture. The cut section of print material is denoted by numeral 110 which is positioned on the easel 100 for exposure.

Figure 2:
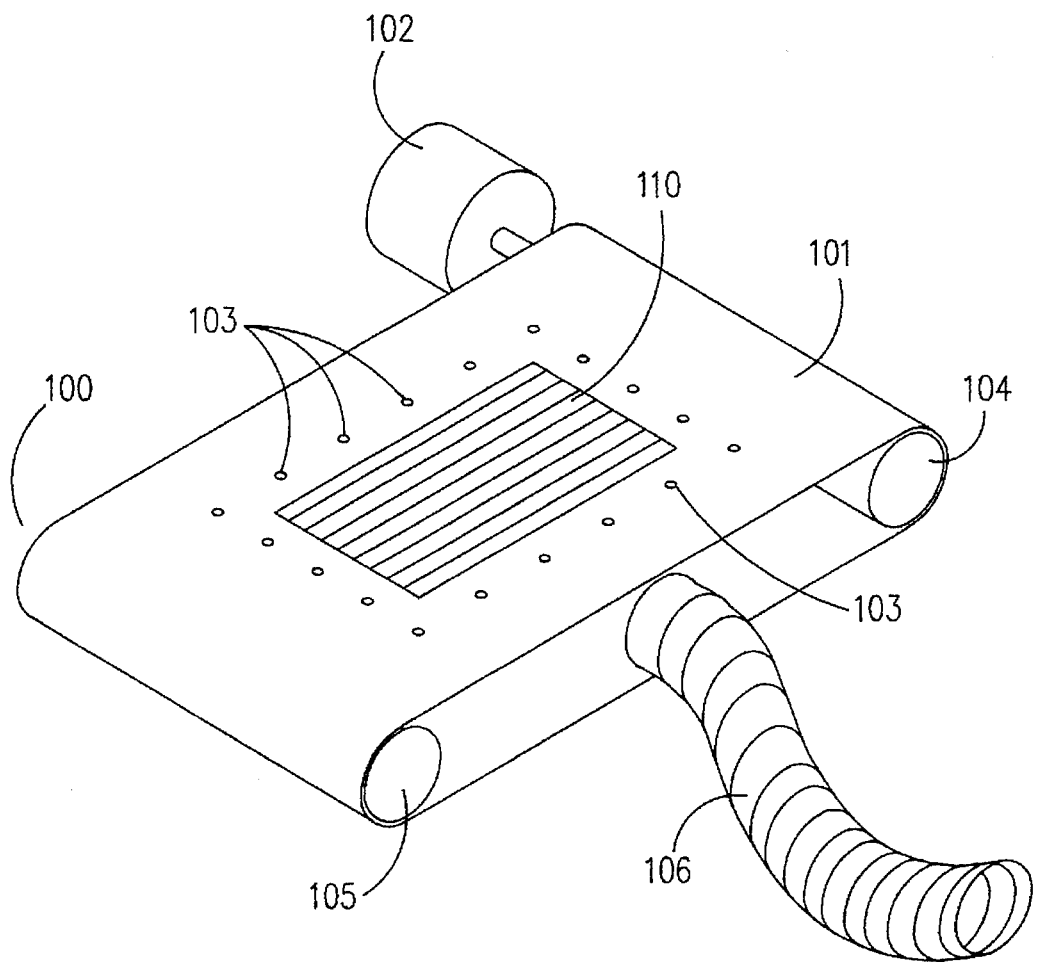
FIG. 2 shows a schematic representation of an easel which is used to pick up a section of print material for exposure. The easel moves to different positions during exposure to change the projection angles. It releases the print material into the chemical processor after the exposure is completed.

The movable easel 100 is used to hold down a section of print material 110 during printing. After the exposure is completed, the print material section 110 is released into the chemical processor 130 for processing. The details of the movable easel 100 are shown in FIG. 2. As shown in FIG. 1, exposed print material section is fed through an intake unit 120 which consists essentially of rollers to drive and guide the print material into the chemical processor 130 to be processed into a 3D picture.

The chemical processor 130 has three processing chemicals in separate tanks. These chemicals are a developer, bleach/fix solution and stabilizer. The chemical processor also has rollers to guide the print material through different tanks. After the print material is properly processed, it is dried by the dryer 140 and is then brought out of the printer. The intake unit 120 consists essentially of a motor and a plurality of rollers for properly guiding the exposed print material into the chemical processor 130 for processing.

Computer 90 is used for many functions including controlling various motors and performing key subject alignment computations. The computer 90 is also equipped with a keyboard and a tracking device such as a trackball so that an operator can communicate with the computer and input data thereto.

In 3D printing, it is required that each of a set of 2D views be exposed through a projection lens onto the print material at different projection angles. Thus, the projection lens and the print material must be moved during printing to different positions, in relation to the exposure position under the lamphouse, to change the projection angles. If the exposure position under the lamphouse is fixed, then the print material 110 must be moved by easel 100 to different positions along the X axis in a printing cycle.

FIG. 2 shows a schematic representation of an easel which is used to pick up a section of print material 110 from the print material cassette 105 and hold the print material in place for exposure. As shown in FIG. 2, The print material 110 is held down by vacuum suction through an array of suction holes on a conveyer belt 101. The suction holes are collectively denoted by numeral 103. Vacuum suction is achieved by drawing air through a suction hose 106. The conveyor belt is driven by a motor 102 and rollers 104 and 105. The entire easel is driven by a motor, which is not shown, to different positions along the X direction. After the print material is exposed, the easel will release the print material, via the intake unit 120, into the chemical processor 130 for processing.

Figure 3:
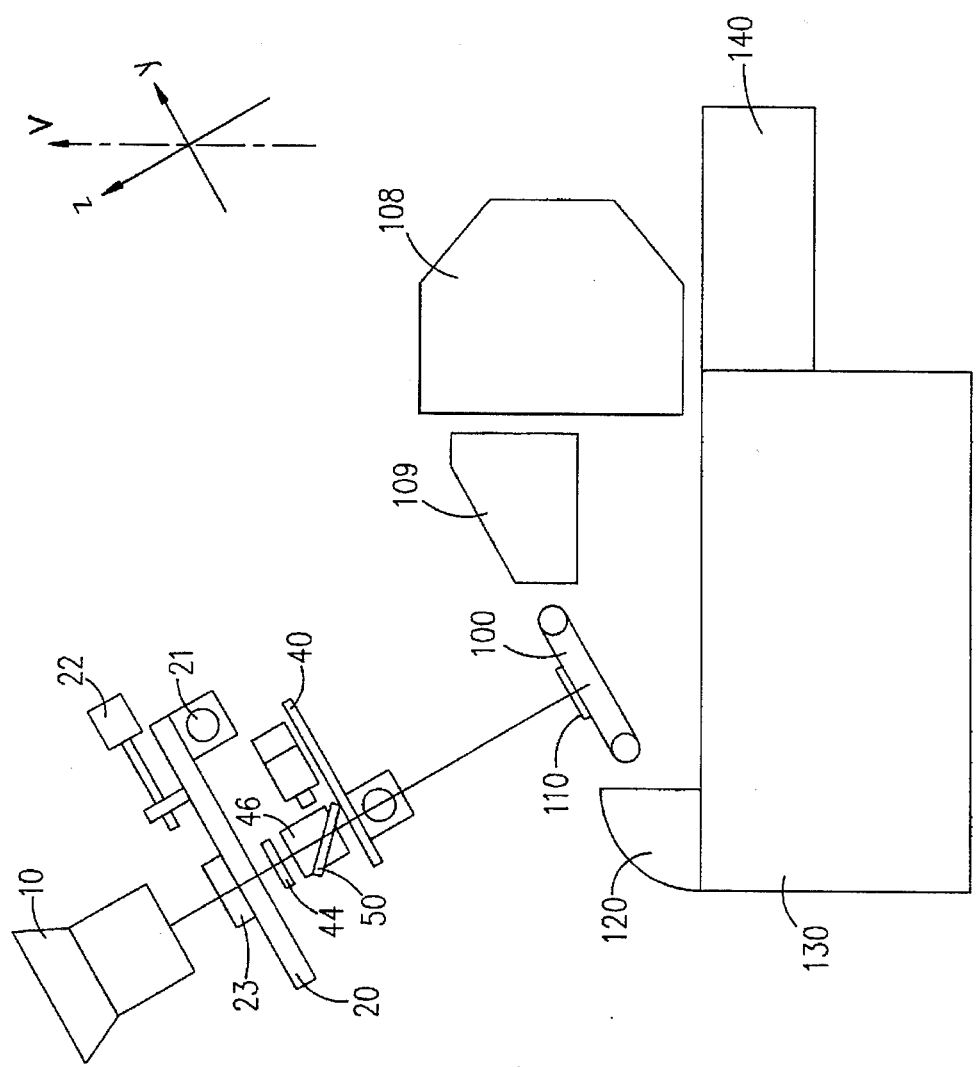
FIG. 3 shows a different arrangement of components in the printer of FIG. 1.

FIG. 3 shows a different arrangement of components in the printer of FIG. 1. Unlike the illustration in FIG. 1 where the optical axis is parallel to a vertical axis, or surface of print material 110, or the XY plane, is approximately perpendicular to a vertical axis V, the printer in FIG. 3 has an optical axis tilted away from the vertical axis. Thus, in the printer of FIG. 3, the XY plane and the Y axis being slanted while the X axis is still parallel to the horizontal plane. In this arrangement, the cut section of print material section 110 comes down from the print material cassette 108 and the cutter/feeder assembly 109 following a proper slope.

Figure 4:
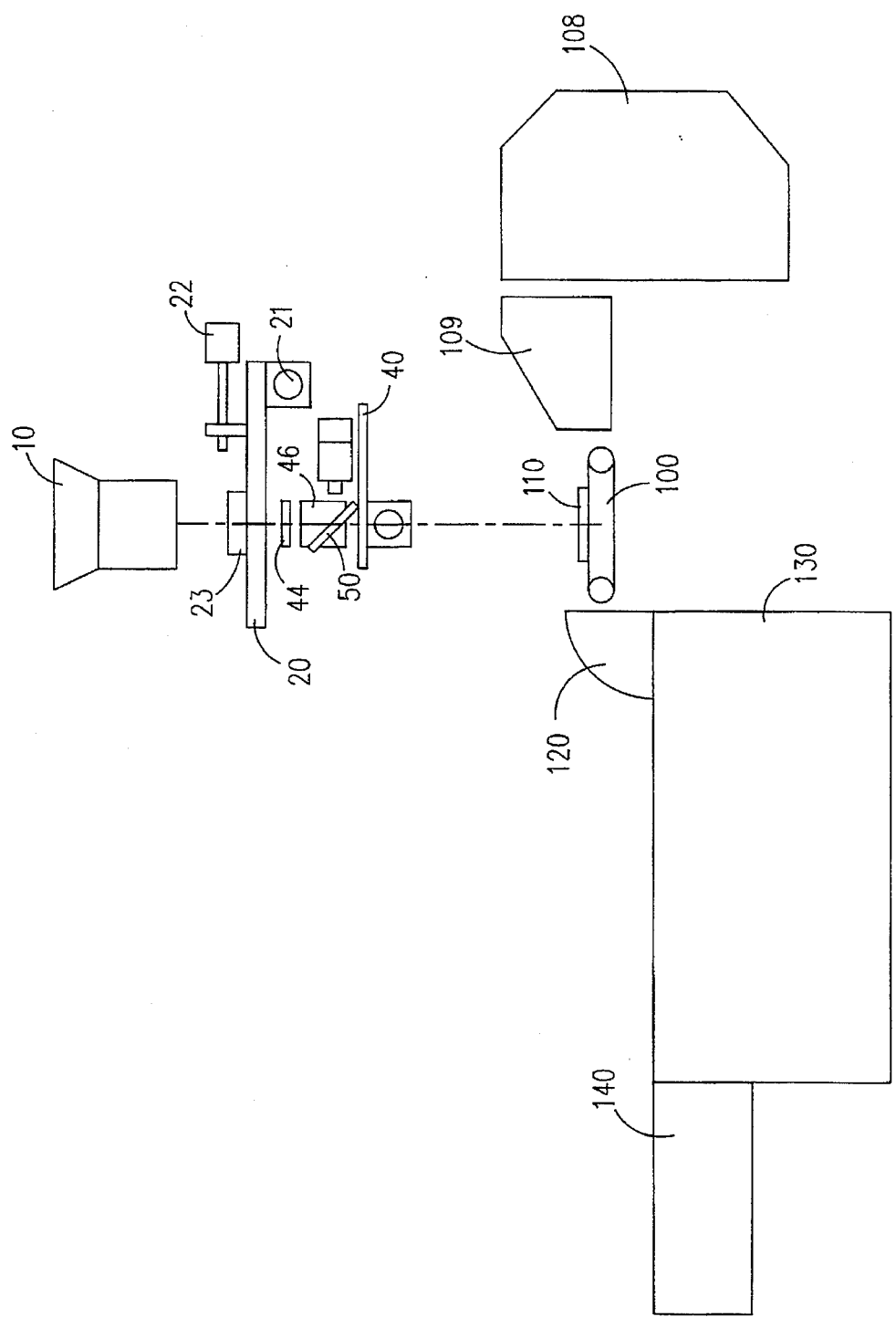
FIG. 4 shows another arrangement of components in the printer of FIG. 1.

FIG. 4 shows another arrangement of components in the printer of FIG. 1. Unlike the printer of FIG. 1 in which the chemical processor is placed beneath the easel, the cutter/feeder and the print material cassette, the printer shown in FIG. 4 places the chemical processor and the print material cassette on the opposite sides of the optical axis. As shown in FIG. 4, while the print material cassette 108 and cutter/feeder assembly 109 are located on the right side of the drawing, the intake unit 120, the chemical processor 130 and the dryer 140 are located on the left side of the drawing.

With the printers shown in FIG. 1, FIG. 3 and FIG. 4, it is feasible that the print material section 110 be moved to different locations to change the projection angles during printing. When the exposure is completed, the easel brings the exposed print material section to a proper location so that the exposed print material can be released into the chemical processor. It should be noted that, however, it is equally feasible that the print material section is kept stationary throughout the printing cycle while the projection lens and the 2D views are moved to different locations to change the projection angles. In that case, the easel is not required to move to different directions along the X axis.

Figure 5:
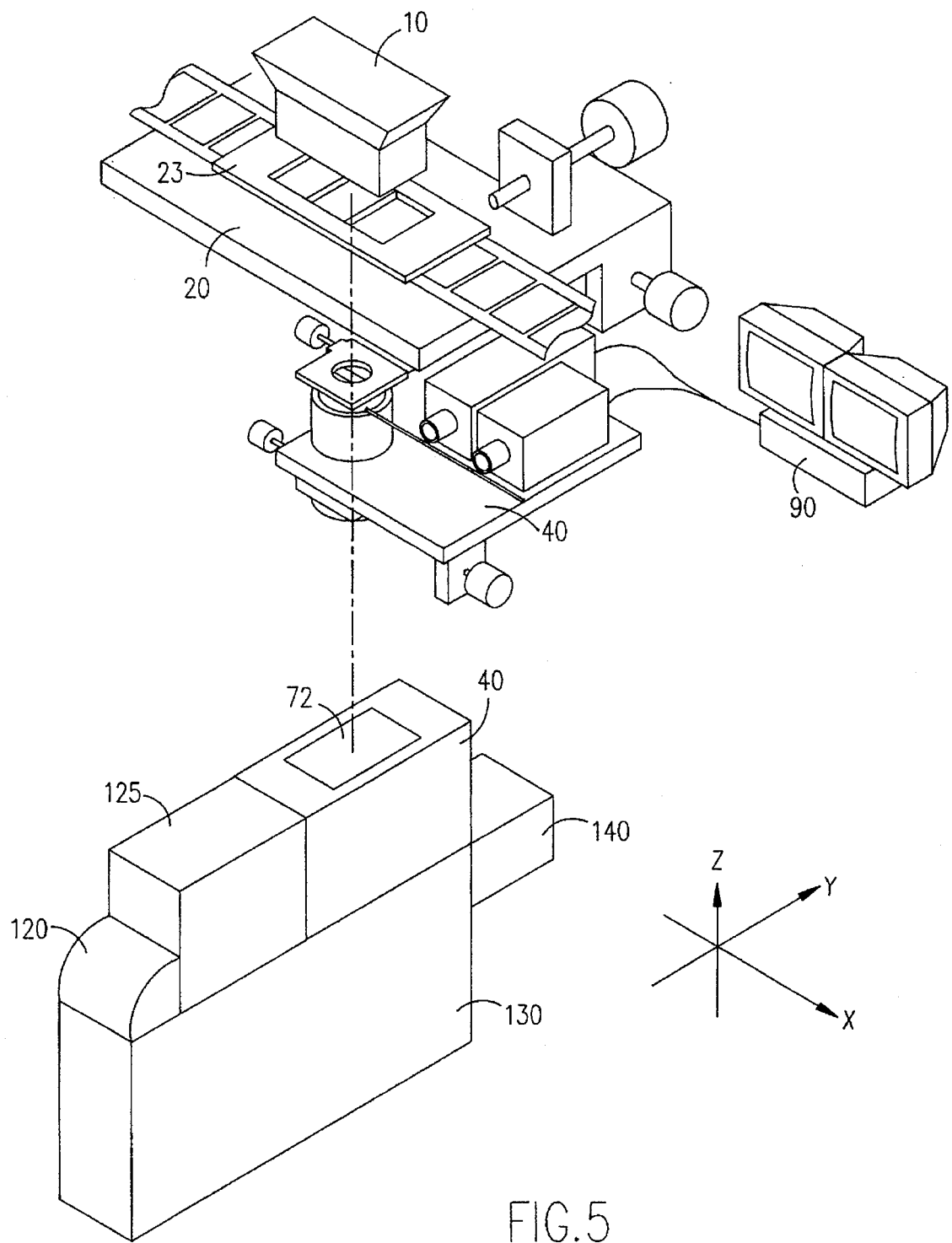
FIG. 5 shows a different embodiment of the present invention.

FIG. 5 shows another embodiment of the present invention where the print material is not cut into sections for printing and 3D pictures are processed individually in the chemical processor. In the printer shown in FIG. 5, 3D pictures are made on an entire roll or a strip of print material, and exposed print material is processed in one or more long strips. As shown in FIG. 5, a print material cassette 70 is used to house a roll of lenticular print material. Numeral 72 denotes a section of the print material to be exposed for composing a 3D picture. In this embodiment, the entire print material cassette is kept stationary in relation to the chemical processor 130. During printing, the projection lens and the 2D views are moved to different positions along the X axis to change the projection angles. When the exposure is completed, the exposed section is driven toward the chemical processor to allow a new section of print material to be exposed. In order to allow for the difference between the printing speed and the processing speed, it is desirable to install a slack loop assembly 125 between the print material cassette 70 and the chemical processor 130. If the printing speed is higher than the processing speed, the length of the exposed print material in the loop assembly will increase until an upper limit is reached. When the upper limit is reached, then the printing should be paused to allow the exposed print material to be properly processed. If the processing speed is higher than the printing speed, then the length of print material in the loop assembly will decrease until a lower limit is reached. When the lower limit is reached, the print material length must be cut so that the processing is not hindered.

Figure 6:
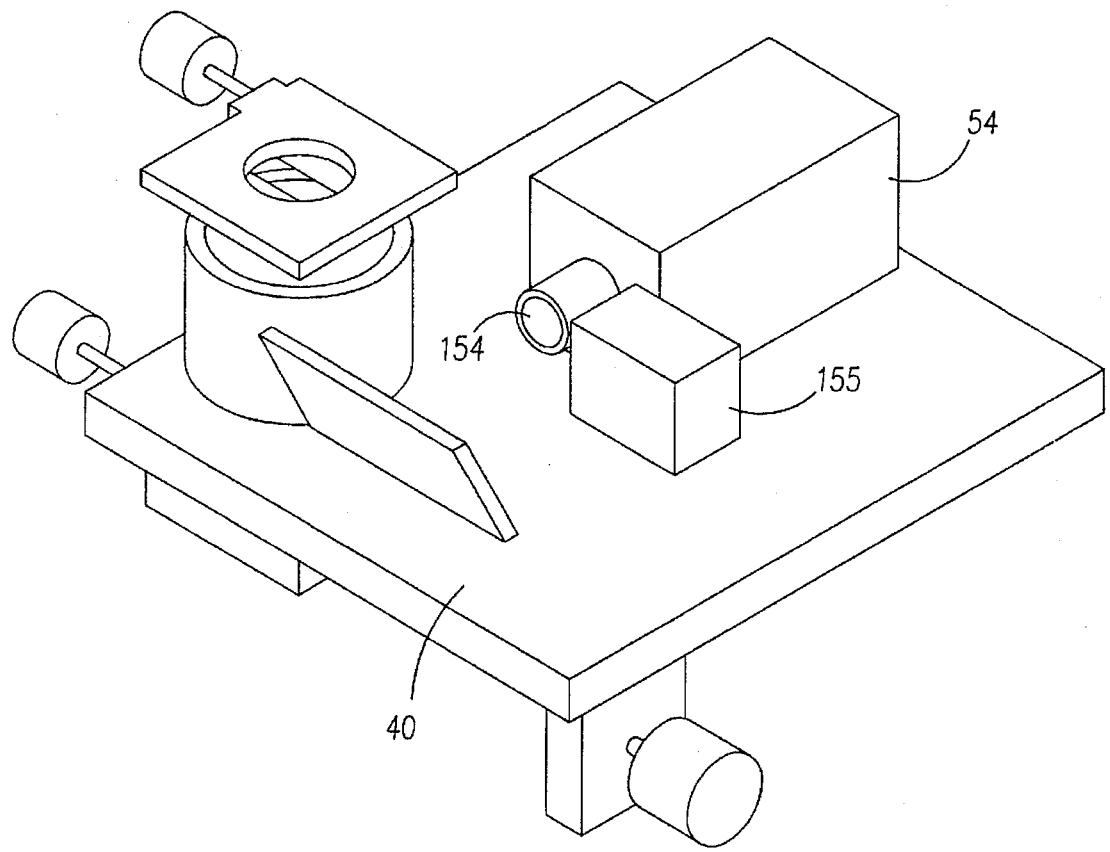
FIG. 6 shows an optical assembly on which a video camera with a lens attachment is used to change the focal length.

FIG. 6 shows an optical assembly 40 on which a video camera is equipped with a lens attachment so that the magnification power of the camera can be varied. As shown, video camera 54 is equipped with a zoom lens 154 and a zoom control mechanism 155. When the camera is used to present a full image of the 2D view to the operator for picture cropping and key subject selection, the zoom lens may be adjusted to a short focal length. But when the camera is used to view an enlarged section of image around the key subject, the zoom lens is adjusted to a longer focal length.

A chemical processor can be installed in-line with any type of 3D printer. It can be installed in-line with the non-scanning 3D photographic printer with a partitioned aperture as disclosed in U.S. patent application Ser. No. 08/349,481 filed Dec. 2, 1994 of which this application is a continuation-in-part application; U.S. patent application Ser. No. 08/349,481 is incorporated herein by reference. A chemical processor can also be included with a 3D printer with direct key subject alignment as disclosed in U.S. patent application Ser. No. 08/069,286 filed May 28, 1993 which application is incorporated herein by reference. A chemical processor can be included with the dual mode 2D/3D printer as disclosed in U.S. application Ser. No. 08/189,786 filed Feb. 1, 1994 and in application Ser. No. 08/377,442 filed Jan. 24, 1995; both of these applications are incorporated herein by reference. The chemical processor can be included in-line with a single stage 3D photographic printer with fast and accurate key subject alignment methods as disclosed in U.S. patent application Ser. No. 08/068,746 filed May 28, 1993; this application is incorporated herein by reference. The in-line chemical processor can be included with a photographic printer that utilizes a linear shutter as disclosed in U.S. Pat. No. 5,019,885, issued May 28, 1991 and with the automatic three-dimensional photo printer to align the key subject image disclosed in U.S. Pat. No. 4,903,069 issued Feb. 20, 1990; both of these patents are incorporated herein by reference.

METHOD OF OPERATION

The following description of the method of operation illustrates the principle of the single-stage printer, according to the preferred embodiment of the present invention as shown in FIG. 1. It should be noted that the description is based on the assumption that a 3D picture is composed of three 2D views acquired at three different angles. Before the printing cycle begins, a section of print material is driven out of the print material cassette and is cut by the cutter/feeder assembly. It is then positioned on the easel for exposure.

Step 1: A set of three 2D views on negative film is engaged in the negative mount 23 so that three image frames align with the three openings on the negative mount, as shown in FIG. 1.

Step 2: The optical assembly 40 moves to a position where the color video camera 54 is in direct view of the first 2D view of the negative set. While the entire or a part of the image is digitized and channeled to the computer 90 for color analysis, the image is presented on monitor 82 to allow the operator to carry out picture cropping and key subject selection. It follows that the negative carrier is driven by the stepping motors 21 and 22 so that the selected key subject of the first 2D view is located in the center of the video image.

Step 3: The optical assembly 40 is moved to a position where the key subject in the first 2D view is in the direct view of the black-and-white camera 52. Through a longer focal-length lens, the black-and-white camera only sees an enlarged section of the first 2D view showing the key subject and immediately surrounding area. This first key subject image is acquired and stored in a frame grabber in computer 90. This key subject image will be used to find the X, Y coordinate location of the key subject in all of the other 2D views.

Step 4: The computer then directs the negative carrier 20 to move by "an adjusted frame distance" to a position where the key subject of the second 2D view is approximately centered in the view of the black-and-white camera. Similar to Step 3, the black-and-white camera acquires the second key subject and surrounding image. The computer determines the "adjusted frame distance", D, according to the following formula:

$$D=d(1+f/K)$$

where d is defined as the center-to-center distance between adjacent 2D views on negative film, and f is the focal length of the 3D camera lenses. K is a typical distance of the key subject from the camera and can be assumed to be about 7 ft.

Step 5: This step involves the computation for a crude alignment of the key subject. Based on the first key subject image data acquired in Step 3 and the key subject image data acquired in Step 4, the computer computes the actual distance of the key subject between the first and second 2D views on negative film for key subject alignment. The key-subject alignment computation is based on a general formula:

$$S(a,b)=\sum_{i}^{n}\sum_{j}^{m}\{P(i,j)-Q(i+a,j+b)\}^2$$

with $1 \leq i \leq n$, $1 \leq j \leq m$, $0 \leq a \leq (N-n)$, $0 \leq b \leq (M-m)$ In the equation, P(i,j) is the intensity of the pixel (i,j) of the P array which is a n×m array of the key subject and surrounding image area of the first 2D view acquired in Step 3; Q(i,j) is the intensity of the pixel (i,j) of a Q array which is a N×M array of the key subject and surrounding image area acquired in the second 2D view acquired in Step 4, with N>n and M>m. S is a correlation coefficient which indicates the matching between the P and Q arrays such that a represents the number of pixels of movement necessary in the X direction and b represents the number of pixels of movement necessary in the Y direction. The purpose of this computation is to seek the minimum value of S, indicating the key subject on the P array being properly aligned with the key subject on the Q array. In this crude computation step, N and M are usually taken to be equal to or greater than 2n and 2m, respectively. In general, the computation in Step 5 does not use all pixels in the n×m or N×M image areas. For example, one can use every second or third i, j, a and b to compute S(a,b) in order to reduce the computation time. If n=m=32, N=M=64 and i, j, a, b are either odd or even numbers, them there will be 65,536 (=16×16×16×16) computations for the square terms in above equation. But if every i, j, a, and b are used, the number of square term computations will be 1,048,576 (=32×32×32×32=16×65,536).

Step 6: This step involves the computation of the fine alignment of the key subject. Let (A,B) be the value of (a,b) where S(a,b) is a minimum according to the computation in Step 5, then the general formula for the fine computation is given by:

$$S(a,b) = \sum_{i}^{u} \sum_{j}^{v} \{P(i,j) - Q(i+a, j+b)\}^2$$

with $1 \leq i \leq u$, $1 \leq j \leq v$, $0 \leq a \leq (U-u)$, $0 \leq b \leq (V-v)$ In the equation, u×v is the dimension of first key subject image (P array) and U×V is the dimension of the second key subject image (Q array) acquired in Step 4 but centered at {(N−n−2A)/2, (M−m−2B)/2}. Unlike the crude computation, the fine computation uses every pixel in the array. Because the key subject image on the Q array is now located at the proximity of that of the P array, we can use a much smaller Q array for computation. For example, if we choose u=v=32, U=V=40 and use every i, j, a and b in the arrays, then the number of square term computation, according to the above equation, is 65,536 (=32×32×8×8). Thus, the total number of square term computations for both crude and fine alignment in this two step process is 2×65×536, a much smaller number than 16×65,536 had we used in one-step process to achieve the same precision in key subject alignment.

Step 7: In this step the computer checks the key subject image alignment to make sure that it is correct. From the results obtained in Step 5 and Step 6, the negative carrier 20 adjusts its position so that the key subject images in the two frames are assumed to be in perfect alignment. More specifically, if (G, H) is the value of (a,b) where S(a,b) is a minimum according to the computation in Step 6, then the negative carrier 20 moves in the X direction by a distance equivalent to G pixels, and in Y direction by a distance equivalent to H pixels as seen by the B/W camera. The insure that the computations in Step 6 are accurate and the that the mechanical movement by the negative carrier is precise, the computer 90 is programmed to check the alignment results. In particular, the computer 90 compares the key subject images according to one of the following equations:

$$D = (1/wW) \sum_{i}^{w} \sum_{j}^{W} \{P(i,j) - Q(i,j)\}$$

$$D = (1/wW) \sum_{i}^{w} \sum_{j}^{W} abs\{P(i,j) - Q(i,j)\}$$

with $i=1,w$; $j=1,W$

In the last equation, abs{x} means the absolute value of x and (1/wW) is a normalization factor. Similar to the equation in Step 5, P(i,j) and Q(i,j) are pixel intensity of the key subject image arrays. Because of the various sources of noise in the video images, D usually does not reduce to zero even when we have a perfect key subject alignment. Thus, we set a satisfactory criterion by assigning a threshold value E such that the alignment result is acceptable only when D is smaller or equal to E. Otherwise the fine alignment computation is repeated.

Step 7a: This step checks whether the computation for the alignment of the second 2D view to the first 2D view has been done twice when D is larger than E. If the answer is no, then the loop goes back to repeat Step 6. If the answer is yes, then operator assistance is summoned and the next step will be Step 7b.

Step 7b: The B/W video images of the first 2D view and the second 2D views are electronically combined and presented on the graphics monitor. The operator uses the trackball to move the negative carrier 20 to manually align the key subject while using the combined video image as a guide, When the manual alignment is done, the procedure proceeds to Step 8.

Step 8: The loop goes back to Step 4, replacing the second 2D view by the third 2D view. When all the key subject alignment for the third 2D view is completed, the procedure proceeds to Step 9.

Step 9: The negative carrier and the optical assembly move to the exposure positions to project all three 2D views onto the print material. The printing cycle is thus completed.

When the printing cycle is completed, the exposed print material section is released into the chemical processor for processing.

While the present invention has been described with reference to the preferred embodiments, it shall be understood by those skilled in the art that various changes may be made and equivalents may be substituted for elements thereof without departing from the spirit and scope of the invention as set forth in the appended claims.

In respect to other 3D printers, the exposed print material after printing is transported to the in-line chemical processor for processing the photographs. The printing cycles of these other printers are not disclosed herein but is incorporated by reference to the patent applications of this continuation-in-part application and the printer patents cited.

What is claimed is:

1. In a 3D printer for printing an image array on the photosensitive surface of lenticular print material from a set of 2D views of a scene with a key subject image on each 2D view, said printer having a negative carrier, a lamphouse and a projection lens on a platform for printing said 2D views at different projection angles onto lenticular print material, and means for moving said platform relative to said negative carrier and lenticular print material, an improvement comprising said printer having a chemical processor in-line with the printer for processing said lenticular print material after said print material has been printed with said 2D views.

2. The printer of claim 1, which comprises at least a print material cassette for housing a roll of said print material.

3. The printer of claim 2 further comprising cutter/feeder means for retrieving said lenticular print material from said cassette and cutting a section of said print material.

4. The printer of claim 3 further comprising movable easel means for holding and moving said cut section of print material for printing, and releasing said print material into said chemical processor for processing.

5. In a printer for printing an image array on the photosensitive surface of lenticular print material from a set of 3D views of a scene with a key subject image on each 2D view, said printer having a negative carrier, a lamphouse, a print material cassette for housing a roll of said lenticular print material, and a projection lens mounted on a platform for printing said 2D views at different projection angles onto lenticular print material, and means for moving said platform relative to said negative carrier and lenticular print material, an improvement comprising:
   (a) the printer being arranged as a single-stage printer and having optical editing means for editing the 2D views and optical locating means for locating the key subject image on each 2D view, said optical editing means and said optical locating means each being placed on said platform, and means for conveying the location of the key subject image to a computer which computes the actual location of the key subject images and controls the relative movement of the platform for correct alignment of the key subject image in each 2D views in a set for printing;
   (b) said single-stage printer having an in-line chemical processor unit for processing said lenticular print material after said print material has been printed with said 2D views.

6. The printer of claim 5 further comprising cutter/feeder means for retrieving said lenticular print material from said cassette and cutting a section of said print material.

7. The printer of claim 6 further comprising movable easel means for holding and moving said cut section of print material for printing, and releasing said print material into said chemical processor for processing.

8. The improvement of claim 5 in which the optical editing means is a color video camera.

9. The improvement of claim 5 in which the optical locating means is a video camera.

10. The improvement of claim 5 in which the optical editing means and the optical locating means is a video camera with a lens attachment to change the effective focal length of the camera between the editing and locating functions.

11. The improvement of claim 5 in which a mirror is used so that said optical editing and optical locating means view the 2D views in the negative substantially at a right angle to the negative.

* * * * *